United States Patent [19]  
Jones et al.

[11] Patent Number: 4,593,063  
[45] Date of Patent: Jun. 3, 1986

[54] HIGH GLOSS, IMPACT RESISTANT POLYMER RESINS FOR INJECTION MOLDING

[75] Inventors: Mary Ann Jones; Charles B. Arends, both of Midland, Mich.

[73] Assignee: The Dow Chemical Company, Midland, Mich.

[21] Appl. No.: 703,002

[22] Filed: Feb. 19, 1985

[51] Int. Cl.$^4$ ............................................. C08L 53/00
[52] U.S. Cl. .................... 524/505; 524/515; 525/95; 525/232; 525/241
[58] Field of Search .................... 525/95, 232, 241; 524/505, 515

[56] References Cited

U.S. PATENT DOCUMENTS

| | | | |
|---|---|---|---|
| 3,536,784 | 10/1970 | Skendrovich | 260/876 |
| 3,585,255 | 6/1971 | Sevenich | 260/873 |
| 3,907,952 | 9/1975 | Cleereman | 264/40 |
| 4,275,179 | 6/1981 | Sherman | 525/95 |
| 4,351,923 | 9/1982 | Tokas | 525/250 |

FOREIGN PATENT DOCUMENTS 1192472  5/1970  United Kingdom ............... 525/95

*Primary Examiner*—Jacob Ziegler
*Attorney, Agent, or Firm*—Price, Heneveld, Huizenga & Cooper

[57] ABSTRACT

The specification discloses a polymer blend comprising 25 to 35% rubber dispersed in a laminar, network fashion in a rigid polymer phase. This is achieved by using a low molecular weight elastomer (70,000 to 100,000 weight average molecular weight) having 25 to 44% styrene and a melt flow rate of 8 to 15 grams per 10 minutes. This polymer blend is especially adapted for injection molding and products injection molded therefrom have a high gloss and excellent strength and toughness. The polymer blend is especially suited for injection molding and yields a high gloss, strong injection molded product.

32 Claims, 3 Drawing Figures

HIGH GLOSS, IMPACT RESISTANT POLYMER RESINS FOR INJECTION MOLDING

BACKGROUND OF THE INVENTION

The present invention relates to improving the gloss in products made from rubber reinforced polymer resin blends, as for example, high impact polystyrene. In order to make rigid polymer materials such as polystyrene tougher, one incorporates thermoplastic elastomers into the resin blend. Larger elastomer particles tend to make the blends tougher, but detract from the glossy finish thereof. If the elastomer particles are smaller, the blends may have better gloss, but are not as tough.

Also, continuing addition of typically used thermoplastic elastomers reduces the melt flow rate of the resin blend and makes processing more difficult. As a result, rubber content is typically kept low to enhance processability and gloss, even though toughness might be further enhanced by additional elastomer content. A typical percentage of thermoplastic elastomer incorporated in impact polystyrene is less than about 10%.

SUMMARY OF THE INVENTION

Surprisingly, it has been found that a tough, high gloss, 25 to 35% elastomer product can be injection molded from a thermoplastic elastomer reinforced polymer blend by controlling the morphology of the blend to ensure laminar morphology in the elastomer phase, while still maintaining the rigid polymer component of the blend as the continuous phase, or matrix material. Even more surprising, this is achieved by increasing the percentage of thermoplastic elastomer, though a particular type of thermoplastic elastomer and most preferably, a particular type of rigid polymer are required.

More specifically, 25 to 35% of a low molecular weight thermoplastic elastomer (70,000 to 100,000 weight average molecular weight) having 25 to 44% styrene and a melt flow rate of 8 to 15 grams per 10 minutes is blended with 65 to 75% of a rigid polymer (most preferably a higher molecular weight polymer). By injection molding this resin blend, one obtains a high gloss, tough product. Further, the resin blend has an excellent melt flow rate which enhances processability. Yet because the rigid polymer remains the continuous phase of the blend, its essential characteristics are retained by the blend.

PREFERRED EMBODIMENT

In the present invention, it is important to control the morphology of the polymer blend so as to achieve a laminar morphology in the elastomer phase (FIGS. 1 and 2) rather than a globular, particulate morphology (FIG. 3) as is commonly achieved. By doing so, one can improve gloss, in an injection molded product, by increasing elastomer content. The resulting products show good environmental stress crack resistance, good impact resistance and other toughness properties.

Figure 3:
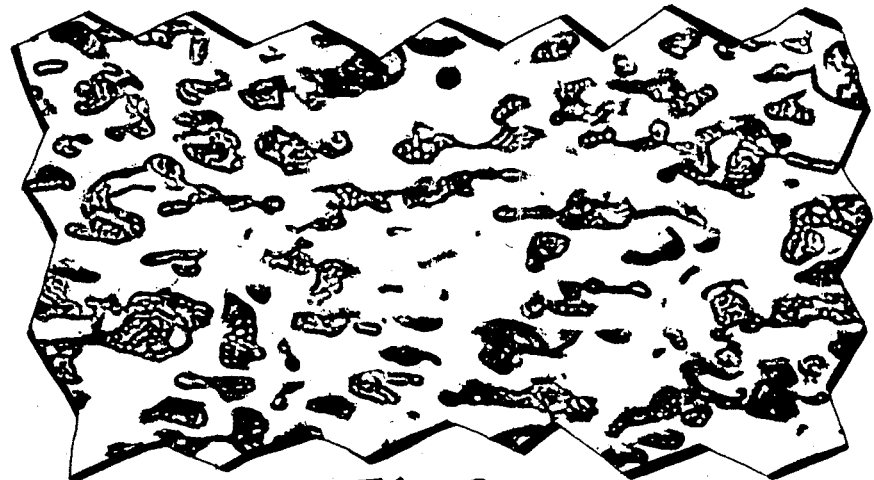
FIG. 3 is a 13,500 magnification of a cross section of a test sample manufactured from a conventional thermoplastic elastomer reinforced polymer blend.

Two basic types of morphologies occur in elastomer reinforced rigid polymer blends. The most commonly achieved is a particulate morphology where discrete zones are formed by the thermoplastic elastomer. In a particulate system, the thermoplastic elastomer often appears more or less globular (FIG. 3).

In contrast, the network morphology which is critical to the present invention occurs where an interconnected elastomer phase is distributed throughout the polymer. There are morphologies which can be said to fall somewhere between the two basic types. These can be described as distorted particles or ribbons. For purposes of the present invention, however, a network morphology of the type shown in either FIG. 1 or FIG. 2 must be achieved.

Of course, it will be appreciated that by substantially increasing the percentage of elastomer in the blend, to the point where the elastomer becomes the continuous phase and the rigid polymer becomes the dispersed phase, one can achieve a laminar, elastomer network based on any elastomer. However, once the elastomer component becomes the continuous phase, the characteristics of the blend become elastomeric and the important strength characteristics of the rigid polymer phase become lost to the blend. Hence the key to the present invention is to achieve laminar, network morphology in the elastomer phase while maintaining the rigid polymer as the dominant continuous phase.

To insure that the rigid polymer remains the dominant, continuous phase, the percentage of elastomer in the blend should not exceed about 35% by weight. It has been found that laminar morphology in the elastomer phase at levels above about 35% are not a function of elastomer type.

Network or laminar morphology of the elastomer in a continuous phase rigid polymer produces excellent elongation and good impact strength and flow properties. In contrast to prior art teachings which involve particulate morphology, the gloss and flow rates of polymer blends made in accordance with the present invention actually increase as the percentage of thermoplastic elastomer increases. Indeed, it is important to ensure that sufficient thermoplastic elastomer is present to establish a laminar morphology. Resin blends with low levels of elastomer which have the potential for creating a laminar or network dispersion but which have insufficient elastomer to actually achieve that network, exhibit a degradation of physical properties.

The key to controlling morphology is the selection of an appropriate thermoplastic elastomer and the use of the proper percentage thereof. Phase contrast micrographs show that a certain percent of elastomer is necessary to obtain a laminar, network dispersion. A blend may begin to exhibit network characteristics at 7% elastomer and not have a completed network until the elastomer is present at a 25 to 35% level. This transformation to a laminar dispersion can often be seen in the non-linearity of certain physical properties, such as tensile strength, as the rubber level increases. Blends are quite weak at the point of transformation. However, once the transformation has occurred, the gloss, toughness and melt flow rate begin to increase continuously as the thermoplastic elastomer percentage increases. This is a characteristic solely of a laminar dispersion of the elastomer and is not found where the elastomer morphology is particulate.

As for type, the thermoplastic elastomer should have a molecular weight of from about 70,000 to 100,000 (weight average molecular weight), contain between about 25 and about 44% styrene, and have a melt flow rate of 8 to 15 grams per 10 minutes. The melt flow rate is determined by standard ASTM testing methods, using Condition G. One commercially available product which has these characteristics is a butadiene-styrene thermoplastic elastomer sold by Firestone under the trademark "STEREON 840." It has a weight average molecular weight of 80,500, 43% styrene and a melt flow rate of 10.9 grams per 10 minutes. Another commercially available butadiene-styrene thermoplastic elastomer is "KRATON TM 2103" sold by Shell Chemical Company. It has a weight average molecular weight of 70,000, contains 28% styrene and has a melt flow rate of 11.8 grams per 10 minutes. Both are triblock copolymer elastomers.

The rigid polymer which is to be reinforced should be of a higher molecular weight. If the molecular weight of the rigid polymer phase is too low, the tensile and impact properties of the blend will be too low.

Where polystyrene is the rigid polymer which is being reinforced, for example, the polystyrene should have a weight average molecular weight of at least about 240,000. A weight average molecular weight of about 300,000 would be even more preferable.

The rigid polymer, which in the most preferred embodiment is polystyrene, and the thermoplastic elastomer are tumble mixed and then extruded. An 0.8 inch barrel Welding Engineers Extruder was used to extrude mix the blend and was set at the following settings:

| Heater | #1 | 170° C. | #4 | 185° C. | Amps | 18 |
| | #2 | 175° C. | #5 | 188° C. | RPM | 275 |
| | #3 | 180° C. | #6 | 188° C. | | |

These settings are conventional and those skilled in the art may vary these for various reasons as is conventional.

The screw configuration itself can of course be varied to achieve different kinds of mixing and shearing. Different configurations will of course lead to some differences in blend properties. However within conventional variation ranges, those differences are found insignificant.

Figure 1:
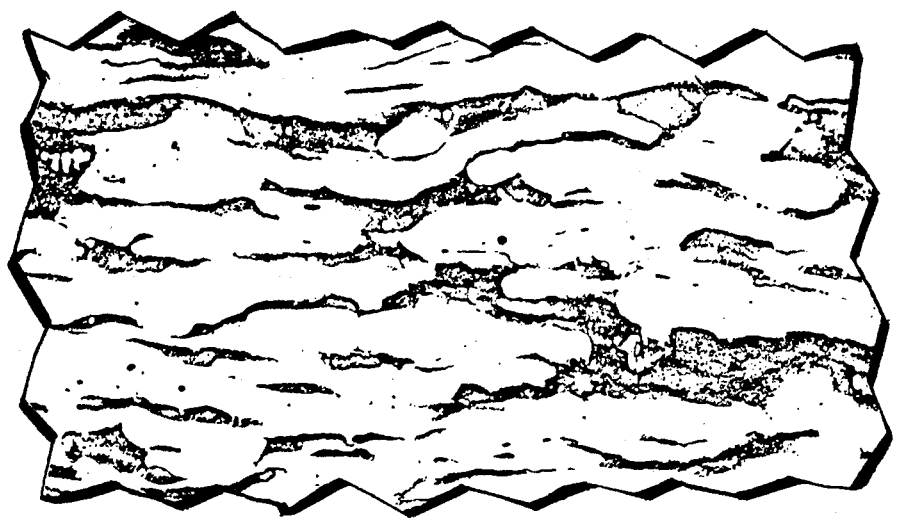
FIG. 1 is a 13,500 magnification of a section of a test blank injection molded from a polymer blend made in accordance with the present invention wherein the blend was passed once through a mixing extruder.
Figure 2:
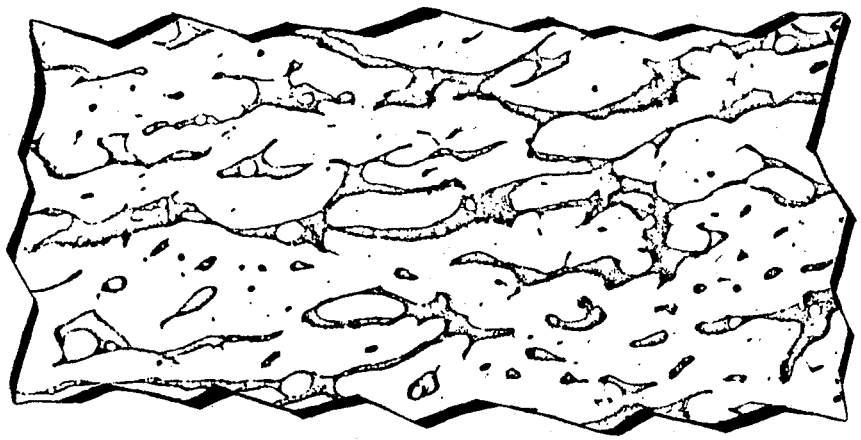
FIG. 2 is a 13,500 magnification of a cross section of a test sample injection molded from a polymer blend made in accordance with the present invention wherein the blend was passed twice through a mixing extruder.

Preferably, the blend is passed twice through the extruder. One pass does establish a laminar network (FIG. 1). However, the second pass through the extruder aids in breaking down some of the larger ribbons and developing a more continuous network dispersion (FIG. 2). If an extruder system was used providing a higher shear to the product and better mixing capabilities, only one pass would be necessary.

The resin blends produced in accordance with the present invention are subject to certain processing limitations. More specifically, the advantageous properties of high gloss and good impact strength are realized only when the resin of the present invention is injection molded. On extrusion, tensile strength drops radically. Tensile strength is extremely poor in compression molded samples.

On the other hand when the blend of the present invention is used in injection molding, the window of processing conditions is relatively large. Excellent results have been obtained at melt temperatures of from about 375° F. to about 450° F.

Optional ingredients can of course be introduced into the resin blend. It has been found that up to about 2% mineral oil (more preferably 1%) can be incorporated into the polymer resin blends of the present invention. This enhances processability without unduly deteriorating strength and toughness of the molded product.

TEST RESULTS

A. Outline Of Tests And Testing Procedures

Tests were conducted to determine the parameters for appropriate elastomer types, appropriate elastomer amounts, the resistance of product made in accordance with the present invention to environmental stress cracking, injection molding melt temperature range for the product and the effect of incorporating 1% mineral oil in resins made in accordance with the present invention. All physical properties measured were measured in accordance with ASTM methods. Properties tested, though not necessarily in every set of experiments, included tensile strength related properties, Gardner dart impact, Izod impact, melt flow rate, Gardner gloss, environmental stress cracking and torsion modulus.

B. Tests For Elastomer Type

In this series of tests, two general purpose polystyrenes were blended with six alternative thermoplastic elastomers. The two polystyrenes both had weight average molecular weights in excess of 240,000. Their properties, molecular weights and Dow Chemical Company trademarks are set forth below:

| a. | General Purpose Polystyrene - STYRON TM 685D | |
|---|---|---|
| | Weight average molecular weight | 300,000 |
| | Number average molecular weight | 130,000 |
| | % Mineral Oil | 0% |
| | Melt Flow Rate | 1.6 g/10 min (Condition G) |
| | Tensile Rupture | 6400 psi |
| b. | General Purpose Polystyrene - STYRON TM 666U | |
| | Weight Average Molecular Weight | 240,000 |
| | Number Average Molecular Weight | 95,000 |
| | % Mineral Oil | 1.0% |
| | Melt Flow Rate | 7.5 g/10 min (Condition G) |
| | Tensile Rupture | 5200 psi |

The six thermoplastic elastomers were all butadiene-styrene elastomers having widely varying molecular weights and melt flow rates. These properties, the percentage of styrene in each and the trademark for each are as follows:

| Elastomer | Mw | % Styrene | Melt Flow Rate |
|---|---|---|---|
| SOLPRENE TM 414 | 150,000 | 40 | 2.2 |
| STEREON TM 840 | 80,500 | 43 | 10.9 |
| KRATON TM 2103 | 70,000 | 28 | 11.8 |
| LC79-2-35 | 86,000 | 51 | 11.0 |
| LC79-2-38 | 120,000 | 45 | 13.1 |
| LC79-2-47 | 72,000 | 45 | 12.5 |

Note: SOLPRENE 414 is a Phillips product, STEREON 840 is a Firestone product, KRATON 2103 is a Shell product and the LC79's are Dow Chemical experimental elastomers.

The six different elastomers were blended with either the STYRON 685D or STYRON 666U on an 0.8 inch Welding Engineers Extruder. The amount of elastomer was 30% by weight in each case and the amount of polystyrene was 70% by weight. All blends were tumble mixed prior to extrusion and given two passes through the extruder at the barrel temperatures, amperage and RPM settings indicated above in the preferred embodiment. Two different but conventional screw configurations were used. One set of blends done at one configuration are indicated below with an asterisk.

The different resins were then injection molded on a Negri Bossi injection molding machine into either tensile bars or round gloss chips. The molding conditions were as follows:

| Temperature | | Pressures | | Time | |
|---|---|---|---|---|---|
| Heater #1 | 400° F. | Injection | 800 psi | Injection | 6 sec. |
| Heater #2 | 425° F. | Hold | 600 psi | Hold | 30 sec. |
| Mold | 110° C. | | | | |

The various properties measured and the results therefore are set forth below in Table 1:

TABLE 1

ELASTOMER PARAMETERS

| Resin Blend | Gardner Impact (in/lbs) | Condition G MFR (g/10 min) | Tensile Yld. (psi) | Tensile Rupture (psi) | % Elong. | Gloss 60° Head |
|---|---|---|---|---|---|---|
| 1. 685D/ SOLPRENE 414 70/30% | 316 | 3.98 | 3780 | 3750 | 52 | 25% |
| 2. 685D/ STEREON 840 70/30% | 257 | 5.39 | 3300 | 3250 | 52 | 93% |
| 3. 685D/ STEREON 840* 70/30% | 160 | 4.83 | 3710 | 3560 | 52 | 100% |
| 4. 666U/ STEREON 840* 70/30% | 71 | 13.92 | 3430 | 2910 | 43 | 96% |
| 5. 685D/ KRATON 2103* 70/30% | 320 | 7.92 | 2800 | 3120 | 47 | 100% |
| 6. 666U/ KRATON 2103* 70/30% | 236 | 21.10 | 2420 | 2640 | 41 | 100% |
| 7. 685D/ LC79-2-35 70/30% | 6.40 | 1.63 | 5190 | 3990 | 55 | 27% |
| 8. 685D/ LC79-2-38 70/30% | 63.2 | 10.3 | 4720 | 4240 | 37 | 17% |
| 9. 685D/ LC79-2-47 70/30% | 180 | 1.26 | 4240 | 3930 | 57 | 21% |

*These were blended with a first screw configuration different from that used for the other blends.

Of the various combinations, those including either STEREON 840 or KRATON 2103 with polystyrene 685D or 666U are in accordance with the present invention. The other combinations fall outside the scope of the invention as set forth above and do not afford the advantageous results of the present invention. Referring to the properties of the various thermoplastic elastomers tested, it will be seen that only KRATON 2103 and STEREON 840 fall within the molecular weight range, melt flow rate range and percent styrene range called for in the present invention.

The STEREON 840 and KRATON 2103 elastomers provided excellent results with either polystyrene 685D or polystyrene 666U. The lowest gloss obtained with these two thermoplastic elastomers was 93%, and in the majority of cases the gloss was 100%. In contrast, the best gloss obtained with the other thermoplastic elastomers was 27%.

Similarly, the strength properties for the resin blends made from STEREON 840, KRATON 2103 and polystyrene 685D and 666U were very good. While the yield and rupture strengths were slightly higher for some of the other combinations incorporating unacceptable thermoplastic elastomers, the yield and rupture strengths for the combinations in accordance with the present invention were all comparable to an acceptable degree.

In terms of Gardner impact and melt flow rate, the resin blends made in accordance with the present invention, i.e., based on STEREON 840, KRATON 2103, polystyrene 685D or polystyrene 666U were in all cases except one superior to combinations not made in accordance with the present invention. The one exception was the combination of 685D and SOLPRENE 414 which exhibited good Gardner dart impact resistance and a reasonable melt flow rate. However, this combination had a gloss of only 25%.

It will be noted that resin blends 2 and 3 are identical. The only difference between the two blends is that they were blended through different conventional extruder screw configurations. While there is some variation in the data points between blends 2 and 3, both are within the realm of acceptability. Hence reasonable variations in conventional screw settings are not critical to achievement of the laminar morphology required by the present invention.

C. Test Establishing Elastomer Amount

Since the best results were obtained using the 685D and STEREON 840, this combination was used to test the limits of composition. Blends comprising 85/15, 70/30 and 60/40% polystyrene to thermoplastic elastomer were tested. The results are set forth in Table 2 below:

TABLE 2

INJECTION MOLDED PROPERTIES AT DIFFERENT ELASTOMER LEVELS

| Composition | Tensile Yld (psi) | Tensile Rupture (psi) | % Elong. | Gardner Dart (in/lbs) | Izod Impact (ft/lbs/ in notch) | Gloss 60° | MFR (g/10 min) |
|---|---|---|---|---|---|---|---|
| 685D/ 840 85/15% | 5450 | 4650 | 34 | 6.0 | 0.42 | 33 | 2.37 |
| 685D/ 840 70/30% | 3300 | 3200 | 52 | 260 | 1.84 | 93 | 5.40 |
| 685D/ 840 60/40% | 1810 | 2730 | 77 | 320 | 9.39 | 97 | 8.52 |

As can be seen, the melt flow rate, the Gardner impact and the gloss of the 85/15% blend were not acceptable. At the 60/40% blend, gloss, melt flow rate and Gardner dart results were definitely acceptable. However, yield strength had slipped to a level which was unacceptably low.

D. Tests For Environmental Stress Cracking

In this series of tests, a blend of 70/30 polystyrene 685D and STEREON 840 was compared to two standard high impact polystyrenes. As can be seen in Table 3 below, the resin blend made in accordance with the present invention exhibited far superior resistance to environmental stress cracking.

TABLE 3

| ENVIRONMENTAL STRESS CRACK | | |
|---|---|---|
| Material | Load (psi) | Time (minutes) |
| STYRON 685D/STEREON 840 | 2000 | 42.0 |
|  | 1500 | 654.0 |
|  | 1000 | 3,560.0 |
|  | 500 | 36,600.0 |
| HIGH IMPACT PS 1 | 2000 | 28.8 |
|  | 1500 | 28.7 |
|  | 1000 | 33.1 |
|  | 500 | 102.0 |
| HIGH IMPACT PS 2 | 2000 | 5.83 |
|  | 1500 | 63.3 |
|  | 1000 | 667.0 |
|  | 500 | 2,080.0 |

E. Tests Establishing Injection Molding Temperature Range

A resin blend made in accordance with the present invention (polystyrene 685D and STEREON 840 at a 70/30%) was injection molded at different temperatures to form a tray. The torsion modulus for each tray, where a part was obtained, was measured. The results are set forth in Table 4 below:

TABLE 4

| INJECTION MOLDED DIVIDED TRAYS | | | |
|---|---|---|---|
|  | Torsion Modulus | | |
| Melt Temperature | Tray Width | Tray Length | Gloss |
| 350° F. | No part | — | — |
| 375° F. | 116,000 psi | 124,000 | 100 |
| 420° F. | 104,000 psi | — | 100 |
| 450° F. | 112,000 psi | — | 95 |
| 475° F. | 108,000 psi | 146,000 psi | 56 |

F. Tests Regarding Mineral Oil Addition

Small amounts of mineral oil were added to a 70/30% blend of polystyrene 685D with STEREON 840. Physical property tests were conducted at levels of 0.4% mineral oil, 0.9% mineral oil and 1.8% mineral oil. The results are set forth in Table 5 below:

TABLE 5

| 685D/840 at 70/30% on Addition of Mineral Oil | | | |
|---|---|---|---|
|  | 0.4% | 0.9% | 1.8% |
| % Mineral Oil |  |  |  |
| Gloss (60°) | 96 | >100 | >100 |
| Izod | 1.49 | 2.13 | 2.29 |
| Gardner Impact | 312 | 272 | 260 |
| Melt Flow Rate (ASTM-Condition G) | 6.24 | 7.22 | 7.74 |
| Tensile |  |  |  |
| Yield (psi) | 3360 | 3070 | 2790 |
| Rupture (psi) | 3110 | 3000 | 2760 |
| % Elongation | 52% | 59% | 53% |

It can be seen that the resin blend easily tolerated up to 1% mineral oil without any significant deterioration of physical properties. Even at the 1.8% level, the physical properties were acceptable. However, it can be seen that yield strength and rupture strength are beginning to deteriorate at this level. Hence, it was concluded that certainly no more than 2%, and preferably no more than about 1% mineral oil should be used in resin blends of the present invention.

CONCLUSION

When injection molded, the resin blends of the present invention provide a product with very high gloss which still have acceptable, and indeed, good strength properties. Yield, rupture and Gardner impact strengths are all of the same order of magnitude as those for resin blends based on larger particle size, particulate rubber morphology resins. Resistance to environmental stress cracking is superior. Hence, high gloss is achieved without sacrificing strength.

Of course, it is understood that the above is a preferred embodiment of the invention and that various changes and alterations can be made without departing from the spirit and broader aspects of the invention as set forth in the appended claims.

The embodiments of the invention in which an exclusive property or privilege is claimed are defined as follows:

1. A method for producing a thermoplastic elastomer reinforced rigid resin blend which will yield a high gloss finish when injection molded comprising:
   blending a rigid polymer with a thermoplastic elastomer;
   controlling the morphology of the thermoplastic elastomer in the resin blend to ensure a laminar, network morphology in the elastomer phase of the blend, while maintaining the rigid polymer as the dominant, continuous phase of the blend.

2. The method of claim 1 which includes selecting an elastomer having a weight average molecular weight of between about 70,000 and about 100,000.

3. The method of claim 2 which includes selecting an elastomer having between about 25 and about 44% styrene in its polymer structure.

4. The method of claim 3 which includes selecting an elastomer with a melt flow rate of between about 8 and about 15 grams per 10 minutes.

5. The method of claim 4 in which the thermoplastic elastomer selected is a butadiene-styrene elastomer.

6. The method of claim 5 which includes blending 25 to 35% of said thermoplastic elastomer with from about 65 to about 75% of said rigid polymer.

7. The method of claim 6 in which said rigid polymer and the thermoplastic elastomer are tumble blended and passed through a mixing extruder.

8. The method of claim 7 in which the rigid polymer selected is polystyrene.

9. The method of claim 8 which includes selecting a polystyrene having a weight average molecular weight of from about 240,000 to about 300,000.

10. The method of claim 9 which includes adding up to approximately 2% mineral oil to the resin blend.

11. The method of claim 2 which includes blending 25 to 35% of said thermoplastic elastomer with from about 65 to about 75% of said rigid polymer.

12. The method of claim 11 which includes selecting as said rigid polymer polystyrene having a molecular weight of from about 240,000 to about 300,000.

13. The method of claim 1 which includes blending 25 to 35% of said thermoplastic elastomer with from about 65 to about 75% of said rigid polymer.

14. A method for producing a thermoplastic elastomer reinforced rigid polymer blend which will yield a high gloss finish when injection molded comprising:

blending with from about 65 to about 75% of a rigid polymer, 25 to 35% of a butadiene-styrene thermoplastic elastomer having a weight average molecular weight of about 70,000 to about 100,000, having a styrene content of from about 25 to 44% by weight and having a melt flow rate of from about 8 to about 15 grams per 10 minutes.

15. The method of claim 14 in which the rigid polymer selected is polystyrene.

16. The method of claim 15 which includes selecting a polystyrene having a weight average molecular weight of from about 240,000 to about 300,000.

17. The method of claim 16 in which the rigid polymer and the thermoplastic elastomer are tumble blended and passed through a mixing extruder.

18. A thermoplastic elastomer reinforced rigid polymer blend which will yield a high gloss finish when injection molded comprising:

a thermoplastic elastomer phase dispersed in a laminar network throughout said rigid polymer phase, said rigid polymer phase being the dominant, continuous phase.

19. The product of claim 18 in which the elastomer has a weight average molecular weight of between about 70,000 and about 100,000.

20. The product of claim 19 in which the elastomer has between about 25 and about 44% styrene in its polymer structure.

21. The product of claim 20 in which said elastomer has a melt flow rate of between about 8 and about 15 grams per 10 minutes.

22. The product of claim 21 in which the thermoplastic elastomer is a butadiene-styrene elastomer.

23. The product of claim 22 which comprises:
25 to 35% of said thermoplastic elastomer; and from about 65 to about 75% of said rigid polymer.

24. The product of claim 23 in which said rigid polymer is polystyrene.

25. The product of claim 24 in which said polystyrene has a weight average molecular weight of from about 240,000 to about 300,000.

26. The product of claim 25 which includes up to approximately 2% mineral oil in the blend.

27. The product of claim 19 which comprises:
25 to 35% of said thermoplastic elastomer; and from about 65 to about 75% of said rigid polymer.

28. The product of claim 27 in which said rigid polymer is polystyrene having a molecular weight of from about 240,000 to about 300,000.

29. The product of claim 18 which comprises:
25 to 35% of said thermoplastic elastomer; and from about 65 to about 75% of said rigid polymer.

30. A thermoplastic elastomer reinforced rigid polymer blend which will yield a high gloss finish when injection molded comprising:

25 to 35% of a butadiene-styrene thermoplastic elastomer having a weight average molecular weight of about 70,000 to about 100,000, having a styrene content of from about 25 to 44% by weight and having a melt flow rate of from about 8 to about 15 grams per 10 minutes; blended with from about 65 to about 75% of a rigid polymer; the elastomer being dispersed in a laminar network throughout the rigid polymer.

31. The product of claim 30 in which said rigid polymer is polystyrene.

32. The product of claim 31 in which said polystyrene has a weight average molecular weight of from about 240,000 to about 300,000.

* * * * *